United States Patent Office 3,825,619
Patented July 23, 1974

3,825,619
ANTISTATIC FIBER CONTAINING HIGH MOLECULAR WEIGHT TRIS(B - HYDROXYALKYL)-ISOCYANURATE-ALKYLENE OXIDE ADDUCTS
Gene C. Weedon, 5431 Lingle Lane, Richmond, Va. 23234, and Edwin D. Little, 505 Pitney Place, Convent Station, N.J. 07961
No Drawing. Continuation-in-part of application Ser. No. 80,488, Oct. 13, 1970, which is a continuation-in-part of application Ser. No. 873,689, Nov. 3, 1969, both now abandoned, and a division of application Ser. No. 215,974, Jan. 3, 1972, now Patent No. 3,741,966. This application Mar. 5, 1973, Ser. No. 337,778
Int. Cl. C08g 41/04
U.S. Cl. 260—857   5 Claims

ABSTRACT OF THE DISCLOSURE

It has been found that an antistatic fiber of polyamide or polyester can be prepared by uniformly dispersing in the polymer between about 1 percent and about 10 percent of a compound represented by the formula

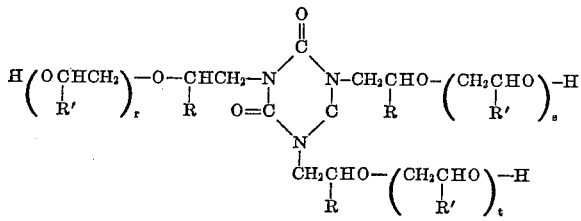

wherein R and R' are independently at each occurrence hydrogen, methyl or ethyl and r, s, and t are integers from 31 to about 200. Preferably, the compound is a block copolymer of ethylene oxide, propylene oxide and tris(B-hydroxyethyl)isocyanurate having a molecular weight greater than 9,000, with the ethylene oxide moiety making up 10 to 95 percent of the molecular weight of the compound.

CROSS REFERENCES TO RELATED APPLICATIONS

This application is a continuation-in-part of application Ser. No. 80,488, filed Oct. 13, 1970, which is a continuation-in-part of application Ser. No. 873,689, filed Nov. 3, 1969 both now abandoned, and discloses matter similar to that of a copending application Ser. No. 873,690, also filed Nov. 3, 1969.

BACKGROUND OF THE INVENTION

This is a division of Application Ser. No. 215,974, filed Jan. 3, 1972, now Pat. No. 3,741,966.
This invention relates to an improved antistatic fiber. It relates in particular to an antistatic fiber containing high molecular weight tris(B-hydroxyalkyl)-isocyanurate-alkylene oxide adducts.
It is known in U.S. Pat. 3,329,557 to Magat and Tanner to use poly(alkylene ether) of high molecular weight to improve static resistant properties of synthetic filaments. More specifically, it is disclosed in U.S. Pat. 3,475,898 to Magat and Sharkey to use poly(ethylene-propylene)ether glycols for the same purpose. This same patent discloses that residues of coupling compounds such as diamines may be present within the polymer chain. However, not all amines coupled with a compound type taught by the Magat and Sharkey patent give a truly antistatic fiber. Also, it is now recognized that many antistatic additives comprising straight-chain ethoxylated compounds are too water-soluble to be retained in the fiber during dyeing or washing operations.

SUMMARY OF THE INVENTION

In accordance with the invention an improved antistatic fiber results when a novel compound described as follows is uniformly dispersed into a fiber-forming polymer being spun into a fiber. The fiber-forming polymer is preferably polyamide or polyester. The antistatic fiber is formed by incorporating into the fiber-forming polymer from about 1 to about 10 percent, preferably about 3 to about 5 percent by weight of a tris(B-hydroxyalkyl)isocyanurate-alkylene oxide adduct represented by the following formula:

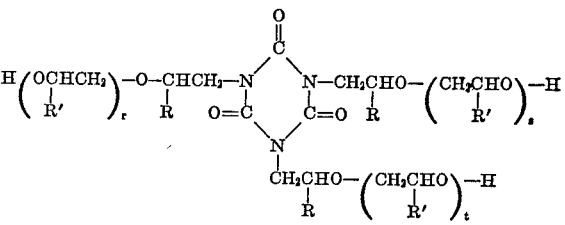

wherein R and R' are independently at each occurrence hydrogen, methyl or ethyl and r, s, and t are integers from 31 to about 200. In the preferred compounds of the invention, R is hydrogen and R' is hydrogen or methyl, and the molecular weight is greater than about 9,000, more preferably at least about 18,000.
Particularly interesting compounds for use in the invention are propylene oxide-ethylene oxide block copolymers based in tris(B-hydroxyethyl) isocyanurate represented by the following formula:

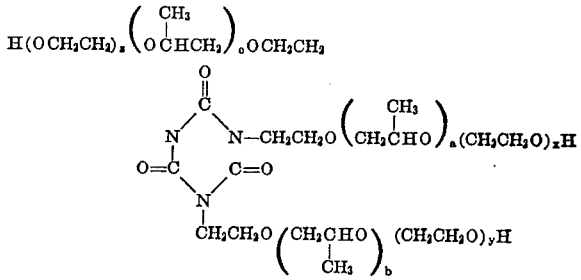

where a, b, c, x, y and z are integers and (a+x), (b+y), and (c+z) are each from 31 to about 200. The ethylene oxide moiety should make up 10% to 95% of the molecular weight of the compound, and the compound should have a molecular weight greater than about 9,000, more preferably at least about 18,000, in order to provide maximum antistatic properties. These highly branched compounds are more strongly held in the polyamide fibers during dyeing and washing operations and additionally provide tertiary nitrogen atoms for improved dyeability. Moreover, presence of the triazine ring in the molecule provides greater heat stability over straight-chain ethoxylated compounds.
As claimed in aforesaid application Ser. No. 873,689, the compounds of the invention are prepared by first reacting a tris(B-hydroxyalkyl)isocyanurate with at least 3 mols of alkylene oxide, then adding a basic catalyst to the reaction mixture. The addition of basic catalyst at this time results in an increased rate of the oxyalkylation reaction without any substantial base-induced decomposition of the isocyanurate ring. Preferably, the conversion to base catalysis is made after reaction of about 3.5 mols of alkylene oxide with the isocyanurate reactant to ensure that each of the three hydroxyalkyl groups has reacted. The reaction is then continued until the desired isocyanurate polyether is obtained, with polyether products having a molecular weight of up to about 28,000 and even higher being readily prepared. If desired, these reaction products may be further chain extended by reaction with at least one compound selected from the group consisting of diepoxides and compounds which yield the following divalent radical

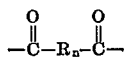

where $R_n$ is a divalent aliphatic radical having 1–20 carbon atoms.

In the instant process, tris(B-hydroxyalkyl) isocyanurates, wherein each hydroxyalkyl group contains from 2 to 4 carbon atoms, are used as reactant and are readily prepared by procedures disclosed in U.S. Pat. 3,088,948. Tris(B-hydroxyethyl)isocyanurate is the preferred reactant, but the hydroxypropyl and hydroxybutyl homologs can be substituted therefor. The isocyanurate is reacted with an alkylene oxide containing from 2 to 4 carbon atoms, i.e., ethylene oxide, propylene oxide, or butylene oxide. A single alkylene oxide can be utilized for this purpose to afford a polyether having identical units in each of the three oxyalkylene chains of the isocyanurate ring, or a combination of alkylene oxides can be utilized. In the latter case, either a mixture of alkylene oxides can be employed, to afford mixed oxyalkylene chains, or different alkylene oxides can be used in sequence, to afford block oxyalkylene chains. The preferred alkylene oxides in the instant process are ethylene oxide, propylene oxide, and combinations thereof.

The reaction may be conducted with or without a solvent, most conveniently without a solvent. For the latter procedure, the isocyanurate is heated above its melting point and the alkylene oxide is bubbled through the molten material. In the case of tris(2-hydroxyethyl)isocyanurate, a reaction temperature between about 134° C. (the melting point) and 160° C. is appropriate. Temperatures in excess of about 160° C. lead to side reactions which interfere with the desired reaction. Preferably, the temperature will be between about 134° C. and 148° C. Also, after the initial phase of the reaction, it is possible to lower the temperature below the melting point of the tris(B-hydroxyalkyl) isocyanurate starting material since the melting point of the polyether product is lower than that of the reactant. In conducting the reaction without a solvent, it is only necessary that the temperature be maintained high enough to afford a molten or fused reaction mixture. Of course, temperatures higher than the minimum may be preferred to increase the rate of reaction. The particular range suitable for the preparation of various hydroxyalkylated compounds within the scope of the present invention can be easily determined by one skilled in the art by noting the minimum temperature necessary to maintain a molten reaction mixture and the maximum temperature before the extent of side reactions becomes unacceptable.

The reaction is preferably conducted in an autoclave with pressure varying with the actual temperature and with the addition and consumption of the alkylene oxide, which is bubbled through the reactant as a gas or as a liquid under pressure.

The reaction may also be conducted with a solvent, which should be inert to the reactants and the products at the temperatures employed. Solvents such as dimethylformamide should be avoided since they lead to the formation of oxazolidones from the isocyanurate reactant. Alcohols and glycols will react with the alkylene oxide. Among the inert solvents which are acceptable are trialkylisocyanurates, N-methylpyrrolidone, acetone, dimethyl ethers of polyethylene and polypropylene glycols, and dialkyl carbonates. The reaction is preferably conducted in an autoclave at the same reaction temperatures as are specified hereinabove for the fusion process. The pressure will vary with the temperature as the alkylene oxide is added and consumed.

During the initial stage of the reaction, before conversion to basic catalysis, an acidic etherification-type catalyst must be added to the reaction medium. Such catalysts have high dissociation constants and produce a pH ranging between about 0 and 6. Illustrative examples of suitable catalysts include sulfuric acid, phosphoric acid, boron trifluoride, and its hydrates and etherates, trichloroacetic acid, aromatic sulfonic acids such as benzenesulfonic acid and toluenesulfonic acid, and the like.

Although the quantity of catalyst may vary over a wide range, it is preferred to employ the catalyst in an amount of about 0.5 to 2% by weight of the tris(B-hydroxyalkyl) isocyanurate. The amount of catalyst used must be sufficient to afford a controlled pH level.

The progress of the reaction may be followed by the change in pressure accompanying consumption of the alkylene oxide. After reaction of at least 3 moles and preferably about 3.5 moles of alkylene oxide per mole of isocyanurate reactant, a changeover is made from acid to base catalysis by addition of a basic oxyalkylation catalyst to the reaction medium. Suitable catalysts for use in the base-catalyzed reaction include sodium hydroxide, potassium hydroxide, calcium hydroxide, sodium carbonate, sodium acetate, sodium methoxide, aluminum alkyls, aluminum alkoxides, and other known basic oxyalkylation catalysts. Sodium and potassium hydroxides are preferred.

Although the amount of basic catalyst added may vary over a wide range, typically sufficient catalyst is added to neutralize the acid catalyst employed in the initial stage of the process, plus an excess amount within the range of about 0.5 to 10% by weight of the original tris(B-hydroxyalkyl)isocyanurate reactant. Preferably the excess amount added will be up to about 5% by weight of the isocyanurate reactant.

After addition of the base catalyst, the oxyalkylation reaction is continued until the polyoxyalkylene chains are built up to the desired length. The resulting product is then recovered by standard techniques, including removal of any solvent employed in the process, and neutralization of the base catalyst with an acid such as hydrochloric acid, sulfuric acid, etc., if desired. The salt formed by the neutralization is insoluble and can be readily removed in known manner, as by filtration.

The tris(B-hydroxyalkyl)isocyanurate - alkylene oxide adducts prepared by the instant process are useful in a variety of applications, such as in lubricants, cosmetic creams and lotions, as functional fluids, and as surface active agents. The higher molecular weight adducts, i.e., those having a molecular weight desirably between about 9,000 and 50,000 are particularly useful antistatic agents for synthetic yarns and fibers. The adducts are added in an amount up to 10%, preferably 3 to 5% by weight of the yarn.

DESCRIPTION OF THE PREFERRED EMBODIMENT

The following examples are provided to illustrate the instant invention more fully. They are provided for illustrative purposes only and are not to be construed as limiting the invention, which is defined by the appended claims. It will be appreciated that variations and modifications in the procedures of the examples can be made by one with skill in the art without departing from the scope of the invention. In the examples all parts and percentages are by weight.

Example I

To a Parr medium pressure stirred autoclave was added 300 parts of tris(2-hydroxyethyl)isocyanurate and 1.7 parts of concentrated sulfuric acid. The contents of the autoclave were heated to 150° C. and 300 parts of propylene oxide were introduced over a period of 135 minutes from a nitrogen-pressurized tank, with pressure being maintained between 50–120 p.s.i.g. The autoclave was then cooled and vented. Three parts of potassium hydroxide were added to a 250 part portion of the resulting tris(hydro[polyoxypropyl]oxyethyl)isocyanurate, which was then heated to 155° C. in the autoclave. An additional 400 parts of ethylene oxide were introduced at 15-40 p.s.i.g. while maintaining the temperature at 150-160° C., to afford 640 parts of an isocyanurate polyether having a calculated molecular weight of 9930 (Product A). To 250 parts of this product were added 350 parts of ethylene oxide and an additional 3 parts of potassium hydroxide, while maintaining the same conditions, to afford a solid isocyanurate polyether having a calculated molecular weight of 24,600 (Product B). Product B had a melting point of 40 to 42° C. Product A and Product B were found particularly useful for preparing antistatic fibers as demonstrated hereinafter.

Example II

The procedure of Example I is repeated wherein 260 parts of tris(2-hydroxyethyl)isocyanurate is reacted in the presence of 0.05% of sulfuric acid with 140 parts of ethylene oxide at 140-160° C. and 50-120 p.s.i.g. to afford 390 parts of tris(hydropolyoxyethyl)isocyanurate. Three parts of sodium hydroxide are added to a 39 part portion of the isocyanurate, and the reaction is continued with introduction of an additional 440 parts of ethylene oxide under the same reaction conditions to afford a solid isocyanurate polyether having a calculated molecular weight of 4790. The product has significant antistatic properties when incorporated into polyamide and polyester fibers but tends to wash out of the fabric more readily than the products of Example I.

Example III

To 250 parts of Product A of Example I was added sufficient ethylene oxide to provide a liquid tris(hydro[polyoxyethylpolyoxypropyl]oxyethyl)isocyanurate having a molecular weight of 18,500. The product contained 2.75% —OH. This product was found particularly useful for preparing antistatic fibers as shown in the following example.

Example IV

This example illustrates the incorporation of preferred compounds of the invention (Product B of Example I and the product of Example III) into nylon carpet yarn as an antistatic agent.

Part A—Preparation of Nylon Carpet Yarn.—Caprolactam (1,000 parts) and aminocaproic acid (50 parts) were heated to 260° C. in one hour and polymerization continued for four hours. Three percent based on the weight of the polymer of the compounds of the invention were added and stirred into the molten polymer for 0.5 to 1.0 hour. The polymer was extruded as a ribbon, chopped into granules, washed with water and dried.

The nylon containing the additives was spun into a 1125 denier 70 filament yarn, 3 plyed to a total 3375 denier and tufted into a jute backing. Mock dyeing was then performed. The final carpet has an 8/32" level loop pile, 7 rows and 7.5 stitches per inch. Carpet test samples were trimmed to 18 x 60".

Part B—Test and Results.—The test procedure for determining electrostatic propensity of carpet samples is as follows:

Carpet squares 18" x 60" were conditioned for 48 hours at room temperature and 20% relative humidity. The carpet sample was placed over an underlay, and a static eliminator was passed over the sample to remove any residual static charge on the sample. A wearer of shoes whose leather soles had been lightly sanded and wiped clean (without touching a bare floor) shuffled in seven steps across the carpet and touched an electrode of an electrostatic voltmeter with a shoe. The reading obtained as the needle paused on its return to zero was recorded. Test results are given as an average of five readings. The maximum voltage allowable for comfort is 3.5 kv. Results below 2.5 kv are considered excellent. Test results are summarized below.

| Test Compound: | Voltage, kv. |
|---|---|
| Example I, Product B | 2.4 |
| Example III | 3.3 |

Example V

A glass reactor equipped with a heater and stirrer was charged with a mixture of 1520 grams of ε-caprolactam and 80 grams of aminocaproic acid. The mixture was then flushed with nitrogen and was stirred and heated to 255° C. over a one hour period at atmospheric pressure to produce a polymerization reaction. The heating and stirring was continued at atmospheric pressure under a nitrogen sweep for an additional four hours in order to complete the polymerization. During the last thirty minutes of the polymerization, 80 grams of an antistatic agent of the present invention were added to the polycaproamide and stirring was continued to thoroughly mix the antistatic agent throughout the polymer. This antistatic agent was a tris(hydro[polyoxyethylpolyoxypropyl]oxyethyl)isocyanurate prepared in accordance with the procedure of Example III and having a molecular weight of about 18,500 and an ethylene oxide moiety content of 93% of the molecular weight. Nitrogen was then admitted to the glass reactor and a small pressure was maintained while the polymer was extruded from the glass reactor in the form of a polymer ribbon. The polymer ribbon was subsequently cooled, pelletized using a Wiley Mill, washed and then dried. The polymer was a white solid having a relative viscosity of about 55 to 60, as determined at a concentration of 11 grams of polymer in 100 ml. of 90 percent formic acid at 25° C. (ASTM D-789-62T).

The polycaproamide pellets containing the antistatic agent were melted at about 285° C. and then melt extruded under a pressure of 1500 p.s.i.g. through a 16-orifice spinnerette, each of the orifices having a diameter of 0.014 inch, to produce a 250 denier fiber. The fiber was collected at about 1,000 feet per minute and was drawn about 3.5 times its extruded length to produce a 70 denier yarn. A control yarn containing no antistatic agent was produced in the same manner as described above. Both yarns were testing as described in Example VI.

Example VI

The 70 denier polycaproamide yarn containing antistatic agent and the control yarn produced in Example V were woven into conventional plain weave fabrics. The fabrics were scoured in a conventional manner and then dyed scarlet in an aqueous dye bath containing Nylomine Acid Scarlet C3GS and Nylomine Acid Yellow C3GS dyes using a conventional dyeing procedure. The fabric containing the antistatic agent dyed to substantially the same shade and had essentially the same hand as the polycaproamide fabric containing no antistatic agent. The presence of the antistatic agent also did not appreciably affect the dye lightfastness of the fabric.

The fabrics were cut into fabric test samples having a width of 3 inches and a length of 9 inches. The fabric samples were tested for their antistatic property in accordance with the general procedure described in the *Technical Manual of the American Association of Textile Chemists and Colorists*, 1969 Edition, Volume 45 at pages 206 and 207. This test procedure is entitled "Electrostatic Clinging of Fabrics: Fabric-to-Metal Test" and is numbered A.A.T.C.C. 115-1969.

The time for each fabric sample to decling completely of its own accord was recorded. Fresh test and rubbing fabrics were used for each determination and the fabric samples were tested in triplicate in both warp and filling directions with nylon and polyester rubbing fabrics.

The fabric samples were also subjected to repeated washings to evaluate the permanency of the antistatic property imparted by the antistatic agent. The fabrics were washed in a commercial washing machine having conventional washing and rinsing cycles at a temperature of about 70° C. using a conventional laundry detergent. The fabrics were then dried in a commercial drier at a temperature of about 80° C. for a period of time of about 30 minutes. Prior to testing, the fabric samples were pressed free of creases with a clean, dry iron at the appropriate settings and were then conditioned from the dry side at 20 percent relative humidity and a temperature of 24° C. for at least 24 hours (Technical Manual of the A.A.T.C.C., page 206, paragraph 4.3, note 9.5).

The average times for each respective set of fabric samples to decling completely of their own accord after 0, 5, 10 and 25 wash cycles are contained in Table I below. The antistatic measurements were made at 20 percent relative humidity and a temperature of 24° C. A cling time of less than 300 seconds is considered to indicate satisfactory antistatic performance.

TABLE I
[Electrostatic clinging of fabrics, fabric-to-metal test results]

| Antistatic agent in fabric | Average times for fabric samples to decling from metal completely on their own accord, seconds | | | |
|---|---|---|---|---|
| | Unwashed | 5 wash cycles | 10 wash cycles | 25 wash cycles |
| None | >600 | >600 | >600 | >600 |
| Antistatic agent of Example V | 0 | 45 | 80 | 127 |

Example VII

Procedures of Examples V and VI were repeated except that 48 grams of the antistatic additive were incorporated into the polymer instead of 80 grams. The cling time for the fabric was 191 seconds after 25 washings. This shows that the instant antistatic additive is effective at relatively low concentrations.

Example VIII

Procedures of Examples V and VI were repeated except that 48 grams of a tris(hydro[polyoxyethylpolyoxypropyl]oxyethyl)isocyanurate having a molecular weight of 9,930 and an ethylene oxide moiety content of 60% of the molecular weight was used. The cling time for the fabric was 135 seconds after 25 washings. As compared with Example VII, this example shows that increased propylene oxide content is desirable, particularly at relatively low molecular weight. These and other data indicate that preferably the ethylene oxide moieties make up about 20% to 80% of the molecular weight of the compound.

Example IX

Procedures of Examples V and VI were repeated except that 48 grams of tris(hydro[polyoxyethylpolyoxypropyl]oxyethyl)isocyanurate having a molecular weight of 28,000 and an ethylene oxide moiety content of 80% of the molecular weight was used. The cling time for the fabric was 125 seconds after 25 washings. This shows the effectiveness of the instant antistatic additive with relatively high molecular weight.

Example X

Procedures of Examples V and VI were repeated using a known antistatic agent having the formula

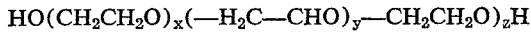

HO(CH$_2$CH$_2$O)$_x$(—H$_2$C—CHO)$_y$—CH$_2$CH$_2$O)$_z$H molecular weight 15,500 and 80% ethylene oxide moiety i.e., sum of $x$ and $z$ is 80% of the molecule. The cling time for fabric as described in Example VI was more than 600 seconds after 10 launderings illustrating the advantage of using the antistatic compound of the present invention.

Example XI

The procedures of Examples V and VI were repeated using an additive having the structure

HO(CH$_2$CH$_2$O)$_x$H and a molecular weight of 4 million. This compound is described in the prior art as an antistatic agent. The cling time for fabric as described in Example VI was more than 600 seconds after 5 washes, illustrating that although a high molecular weight polyethylene oxide was used, it is not an effective antistatic agent as defined by the cling test.

Example XII

The procedures of Examples V and VI were repeated using an additive prepared as described in British Pat. 793,915 and having a molecular weight of about 20,000. This compound is described as an antistatic agent in the prior art.

The cling time for fabric as described in Example VI was over 600 seconds after 5 washes, illustrating that a high molecular weight polyethylene glycol is a non-durable antistatic agent as measured by the cling technique.

Example XIII

This example illustrates addition of antistatic agent by injection into molten poly-epsilon-caprolactam prior to spinning. A conventional coil melter was used to melt the nylon 6 polymer which had a relative formic acid viscosity of 49. The antistatic agent of the present invention, as described in Example VIII, was injected at 90 to 100° C. into the molten stream prior to the main pump at a constant rate so that 4% of the additive was present in the final fiber. A final spinning temperature of 270° C. was used. The spinnerette pack consisted of layers of four different mesh sizes of sand. The spinnerette contained 12 holes, 0.25 mm. in diameter. Filaments were spun and drawn in a conventional way using a 3.33 draw ratio to give 40 denier 12 filament apparel yarn. The yarns were woven and tested as described in Example VI. The cling time was 120 seconds after 25 washings, illustrating effective antistatic control when the additive was incorporated by injection. A control yarn containing no antistatic agent similarly prepared and woven had a cling time of more than 600 seconds after 5 washes. A yarn containing 4% additive of Example XII was woven into a fabric and also had a cling time of more than 600 seconds after 5 washes.

Example XIV

This example describes addition of antistatic additives into an extruder.

The antistatic agent, such as the one described in Example III, was injected into an extruder and blended with molten nylon 6 polymer to give about 4% of the additive spun through spinnerettes as described in Example XIII.

The filaments were spun and drawn and woven into fabrics and tested by the cling test of Example VI. The cling time was 175 seconds with 3%, and 136 seconds with 4% additive after 25 washes.

Example XV

The procedure of Example IV was repeated using an antistatic agent represented by the general formula:

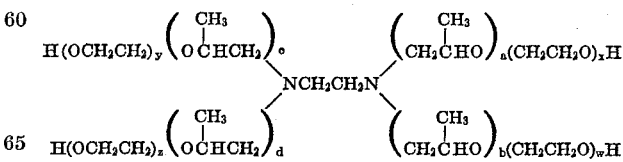

where $a$, $b$, $c$, $d$, $w$, $x$, $y$, and $z$ are each a whole number and the total of $a$, $b$, $c$, and $d$ is between 8 and 850 and the total of $w$, $x$, $y$, and $z$ is between 8 and 1,000. The specific antistatic compound used had a molecular weight of 18,600 and the ethylene oxide moiety made up 70% of the molecular weight. The voltage generated in the shuffle test was 5.1 kv. This result shows that the antistatic additive tested is not as effective as the novel antistatic additive of the present invention.

Example XVI

The procedurees of Examples V and VI were repeated using an additive of the structure given in Example XV with a molecular weight of only 3400 and an ethylene oxide content of 40%. The cling time for the fabric as described in Example VI was over 300 seconds after 5 and 10 washes, illustrating that low molecular weight compounds of the structure given in Example XV are not suitable as durable antistatic agents.

Example XVII

This example shows that the antistatic compounds of the present invention are useful in fibers other than polyamide fibers.

Polyethylene terephthalate was prepared by addition of 465 parts of ethylene glycol and 830 parts of terephthalic acid to a 1 gallon autoclave. The autoclave was closed and purged 3 times with nitrogen, pressured to 75 p.s.i.g. with nitrogen and heated to 263° C. for 4 hours. Distillate was removed periodically while pressure was maintained at 75 p.s.i.g. by venting. Polymerization was continued for 4 hours under full vacuum, about 0.7 mm. Hg, at 275 to 283° C. One hour prior to extrusion 48 parts of the same antistatic agent as described in Example V was added and blended with the polymer. The batch was extruded at about 5 p.s.i., and later chipped, washed and dried. Polymer was spun using conventional equipment to give a 70 denier, 16 filament yarn after drawing, woven and tested as described in Example VI. Control fabric with no additive had a cling time of more than 300 seconds after 25 washings, while the sample from this example containing 4% antistatic additive had a cling time of 153 seconds after 25 washings.

DISCUSSION

By "antistatic" is meant fibers that will pass the cling test and the shuffle test, at a voltage level less than about 3.5 kv., as described in the above examples. By "fiber" is meant multifilament yarn, monofilament, staple, and all the known physical forms of synthetic fibers. By "polyamide" is meant the polymers made by condensation of diamines with dibasic acids or by polymerization of lactams or amino acids, resulting in a synthetic resin characterized by the recurring amide group —CONH—. By "polyester" is meant the synthetic resins produced by the reaction of a dibasic acid with dihydric alcohols, or a trifunctional monomer such as glycerol or citric acid. By "ethylene oxide moiety" is is meant the portion of the chemical molecule —($CH_2CH_2O$)—. By "molecular weight" is meant the conventional number average molecular weight. By "uniformly dispersed" is meant dispersion adequate to provide antistatic properties to the fiber. Mixing by the methods of the above examples is sufficient.

We claim:

1. An antistatic fiber of polyamide, said fiber containing between about 1% and about 10% by weight of a compound represented by the formula:

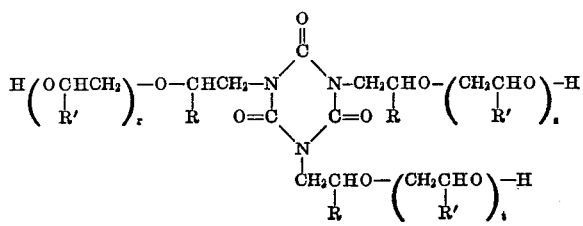

wherein R and R' independently at each occurrence are hydrogen, methyl or ethyl, and $r$, $s$ and $t$ are integers from 31 to 200.

2. The antistatic fiber of claim 1 wherein R is hydrogen and R' is hydrogen or methyl and the molecular weight of the compound is greater than about 9,000.

3. The antistatic fiber of claim 2 wherein the molecular weight of the compound is between about 18,000 and about 50,000.

4. An antistatic fiber of polyamide, said fiber containing between about 1% and about 10% by weight of a compound represented by the formula

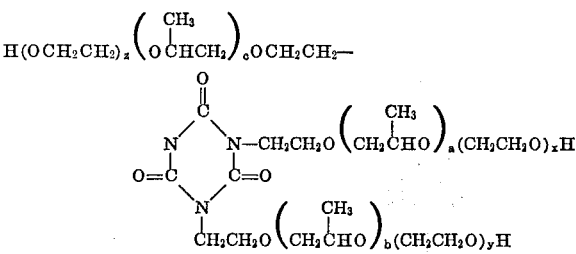

where $a$, $b$, $c$, $x$, $y$, and $z$ are integers and $(a+x)$, $(b+y)$, and $(c+z)$ are each from 31 to about 200, said compound having a molecular weight greater than about 9,000 and said ethylene oxide moieties making up 10% to 95% of the molecular weight of said compound.

5. In a method of preparing an antistatic fiber of polyamide, comprising uniformly dispersing an antistatic additive in a fiber-forming polymer, and then forming the fiber by conventional methods, the improvement consisting of using for the antistatic additive, about 1 to 10% by weight of a compound represented by the formula

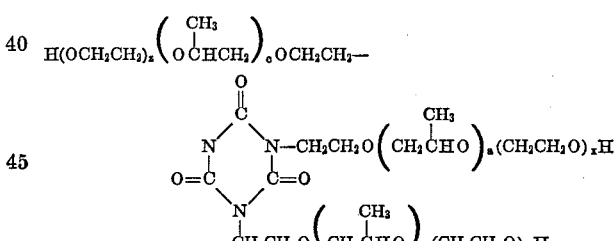

where $a$, $b$, $c$, $x$, $y$ and $z$ are integers and $(a+x)$, $(b+y)$, and $(c+z)$ are each from 31 to about 200, said compound having a molecular weight greater than about 9,000 and said ethylene oxide moieties making up 10% to 95% of the molecular weight of said compound.

References Cited
UNITED STATES PATENTS

| | | | |
|---|---|---|---|
| 3,121,082 | 2/1964 | Guttag | 260—248 |
| 3,657,386 | 4/1972 | Weedon et al. | 260—857 PG |

PAUL LIEBERMAN, Primary Examiner

U.S. Cl. X.R.

117—138.8 A; 252—8.8; 260—75 TN, 77.5 NC, 78 SC, 860

UNITED STATES PATENT OFFICE
CERTIFICATE OF CORRECTION

Patent No. 3,825,619        Dated July 23, 1974

Inventor(s) Gene C. Weedon and Edwin D. Little

It is certified that error appears in the above-identified patent and that said Letters Patent are hereby corrected as shown below:

Column 1, line 7, insert --Assignee: Allied Chemical Corporation, New York, N.Y.--.

Column 1, formula

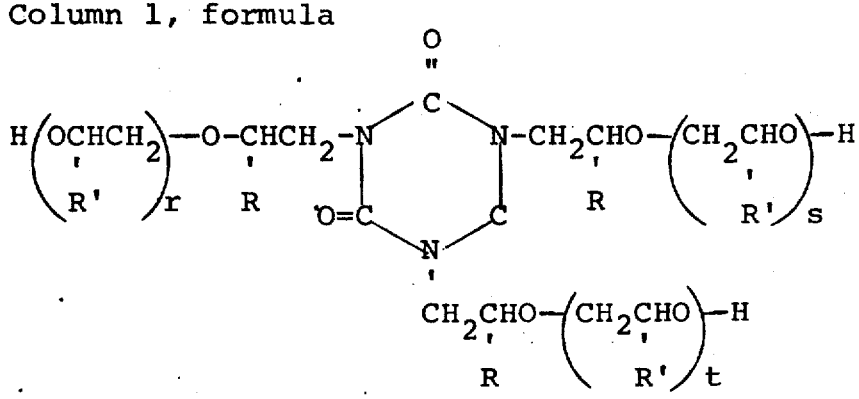

should read:

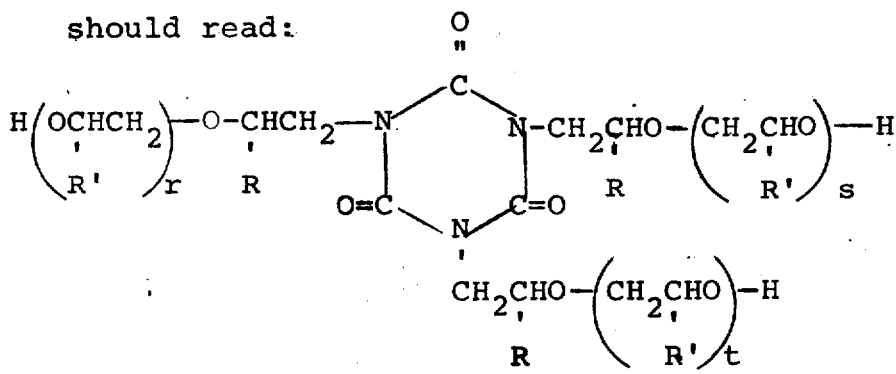

Signed and sealed this 17th day of December 1974.

(SEAL)
Attest:

McCOY M. GIBSON JR.
Attesting Officer

C. MARSHALL DANN
Commissioner of Patents